United States Patent
Akell

[15] 3,644,214

[45] Feb. 22, 1972

[54] EMULSION BREAKING

[72] Inventor: Robert B. Akell, Wilmington, Del.

[73] Assignee: E. I. du Pont de Nemours and Company, Wilmington, Del.

[22] Filed: Oct. 29, 1969

[21] Appl. No.: 872,181

[52] U.S. Cl..............................252/320, 252/327, 252/348, 210/21, 210/65
[51] Int. Cl.........................................................B01d 17/00
[58] Field of Search..................252/326, 327, 319, 348, 320; 210/21, 65, 73

[56] References Cited

UNITED STATES PATENTS 3,168,585   2/1965   McCarthey............................260/677

*Primary Examiner*—John D. Welsh
*Attorney*—Harry J. McCauley

[57] ABSTRACT

Breaking emulsion forming at the interface in a relatively immiscible liquid-liquid contacting process by withdrawing it, adding one component thereof in an amount sufficient to shift the composition to the one-phase region of the solubility diagram, then collecting the product obtained.

3 Claims, 6 Drawing Figures

EMULSION BREAKING

BRIEF SUMMARY OF THE INVENTION

Generally, this invention comprises, in a liquid-liquid process employing liquids possessing relatively low-mutual solubilities wherein an emulsion forms at the interface of the liquids being contacted, the process comprising, in sequence: (1) withdrawing the emulsion from the interface, (2) adding to the emulsion a quantity of a preselected component of the emulsion in an amount sufficient to bring the composition of the emulsion into the one-phase region of the solubility diagram for the component system making up the emulsion and (3) collecting the product from (2).

DRAWINGS

Figure 1:
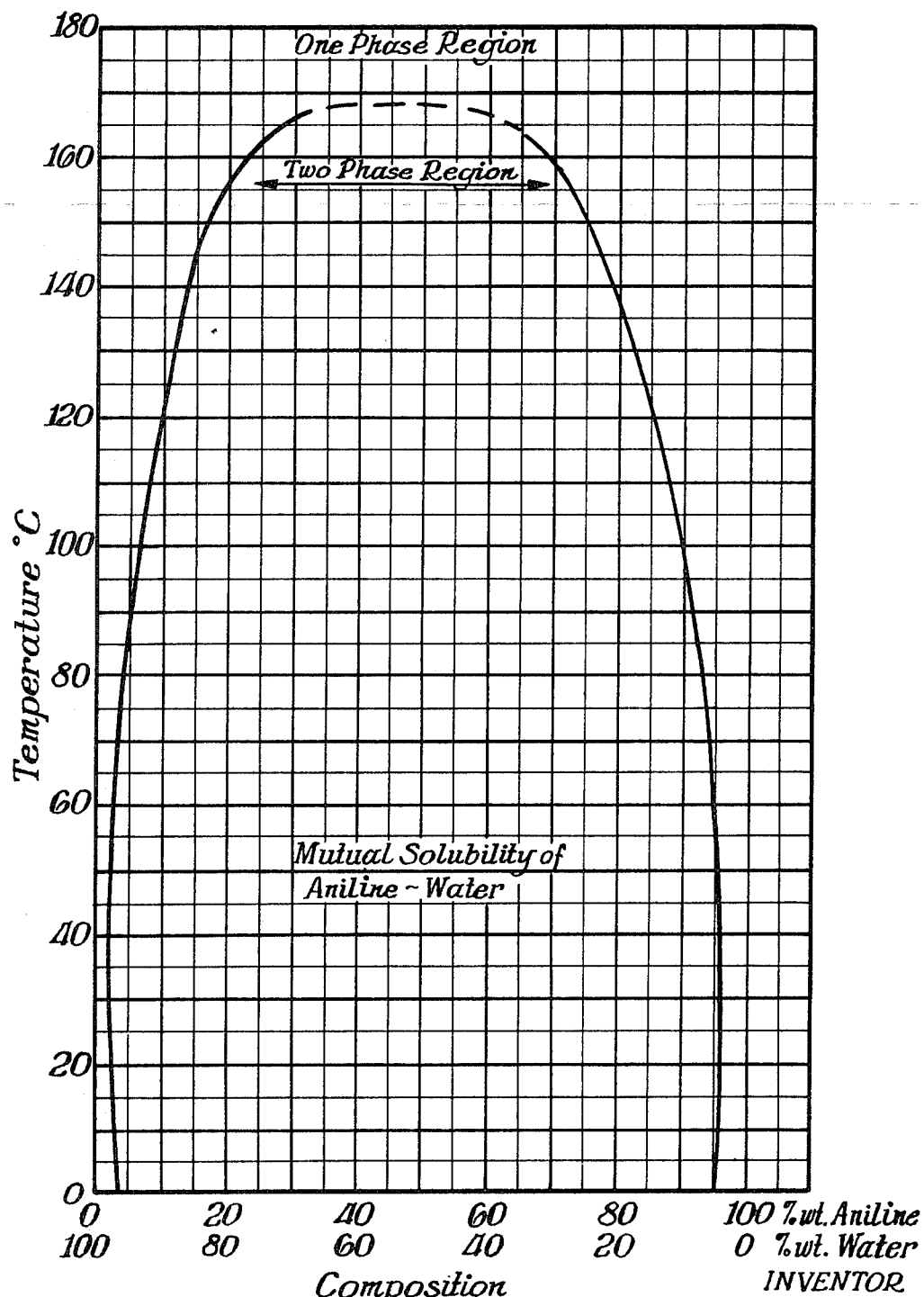
Figure 2:
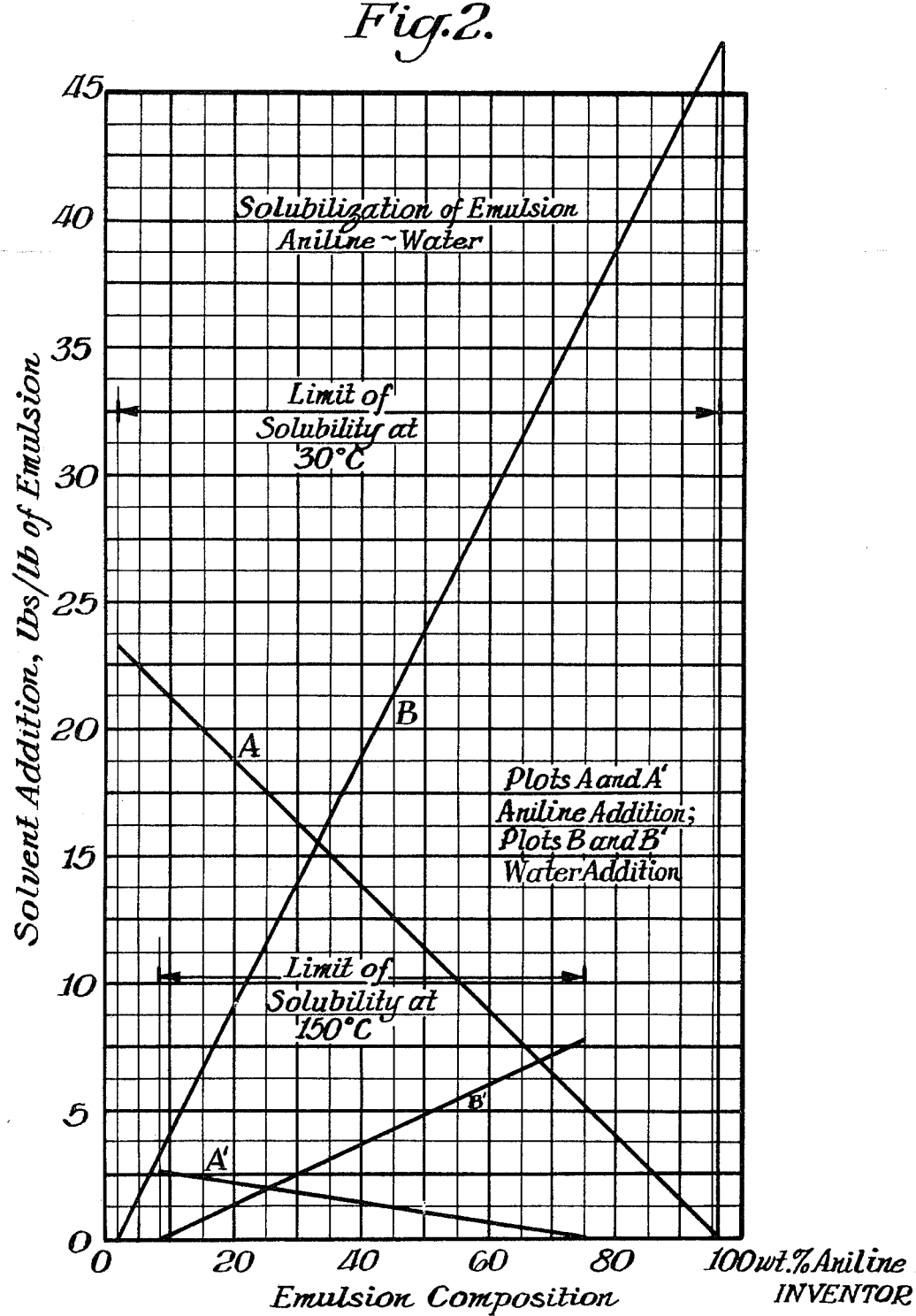
Figure 3:
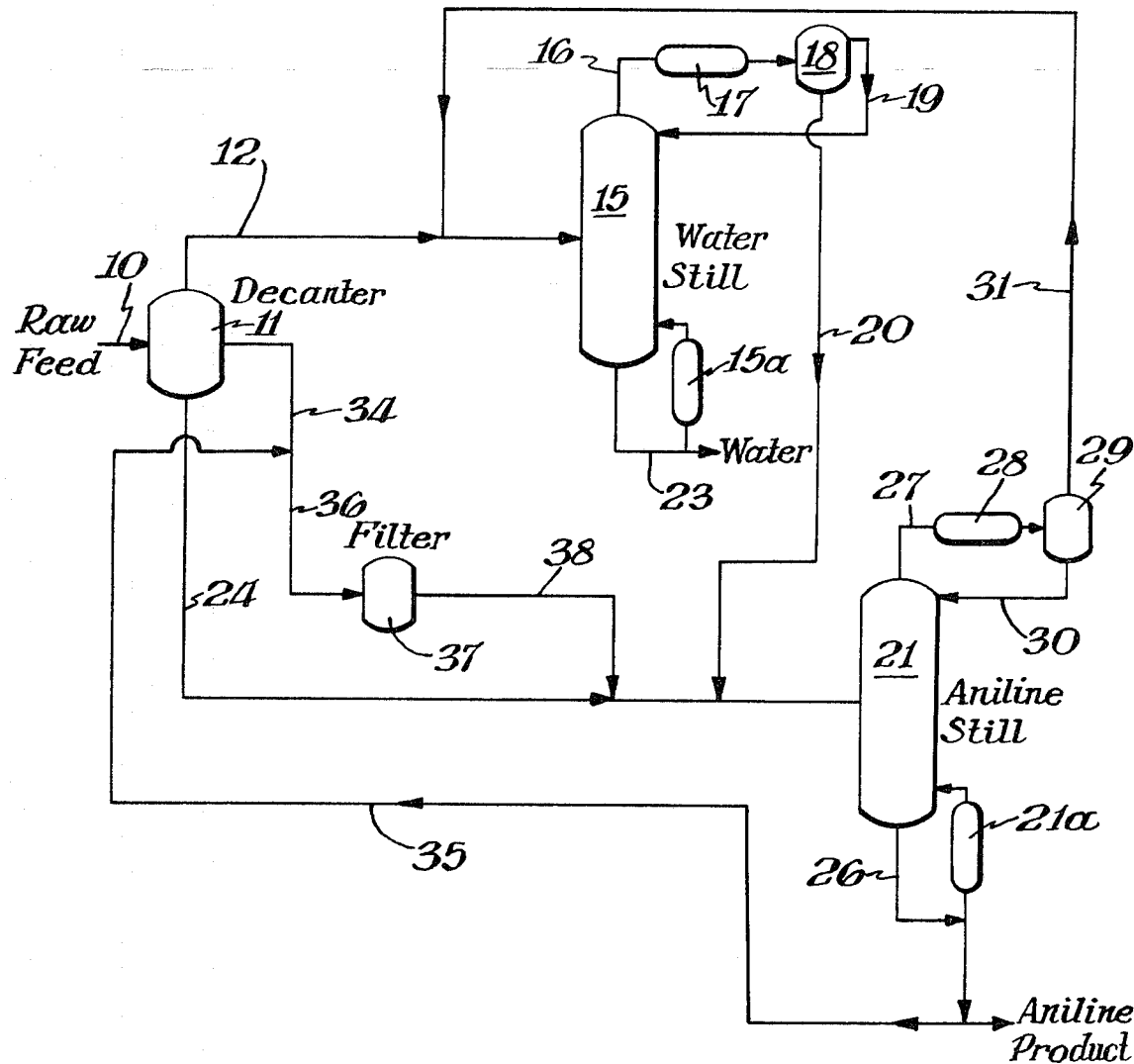
Figure 4:
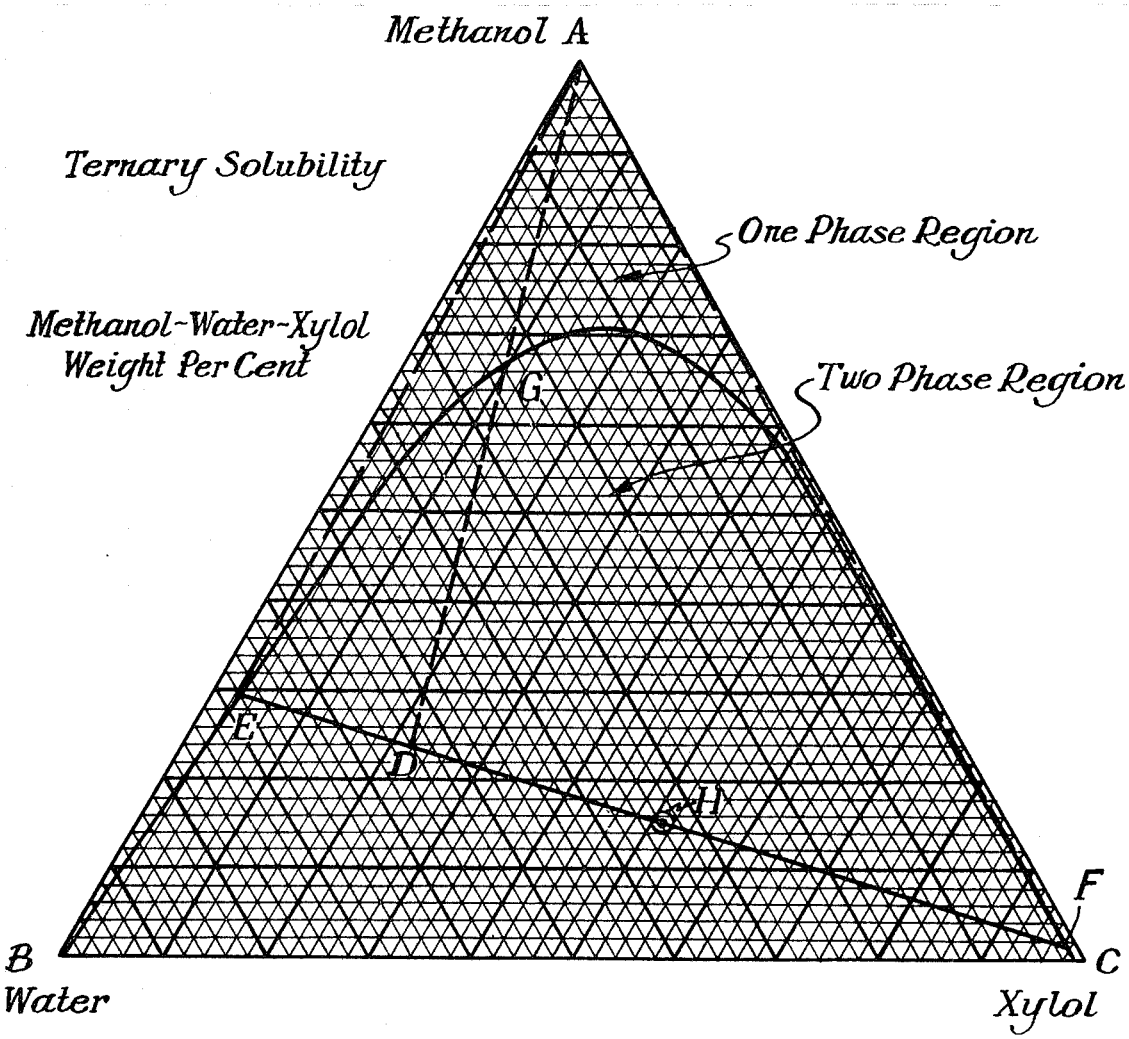
Figure 5:
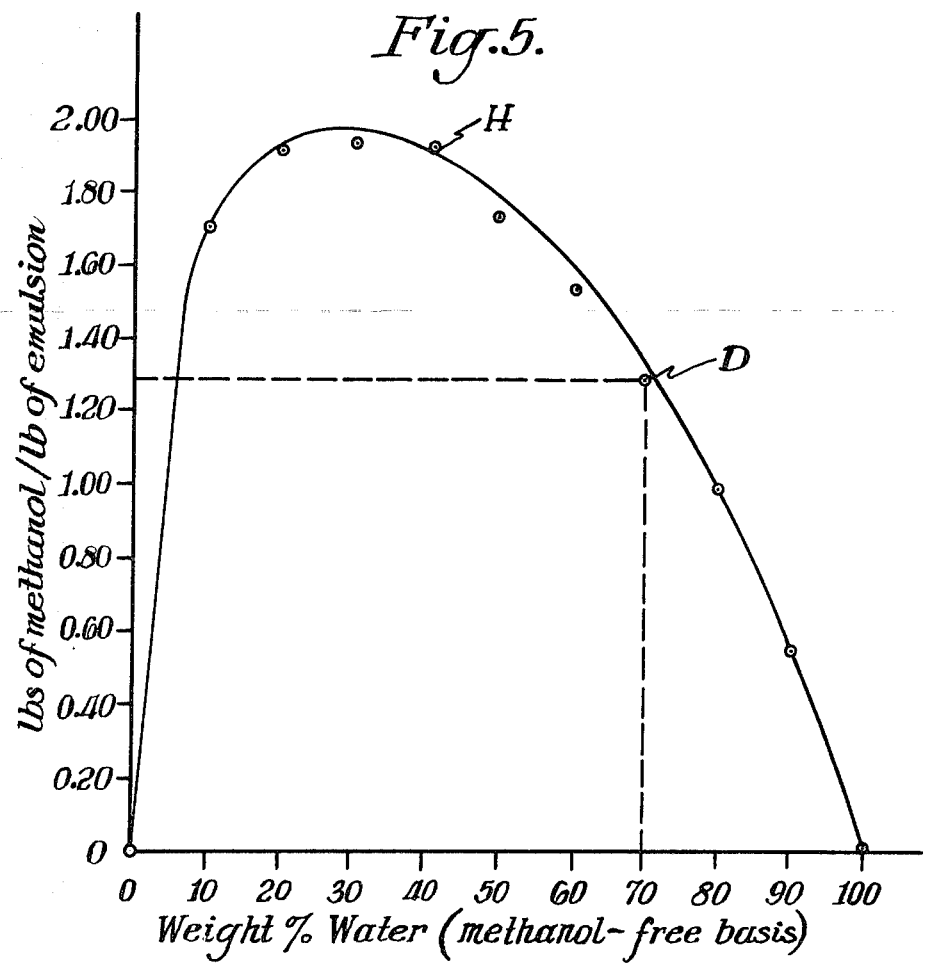
Figure 6:
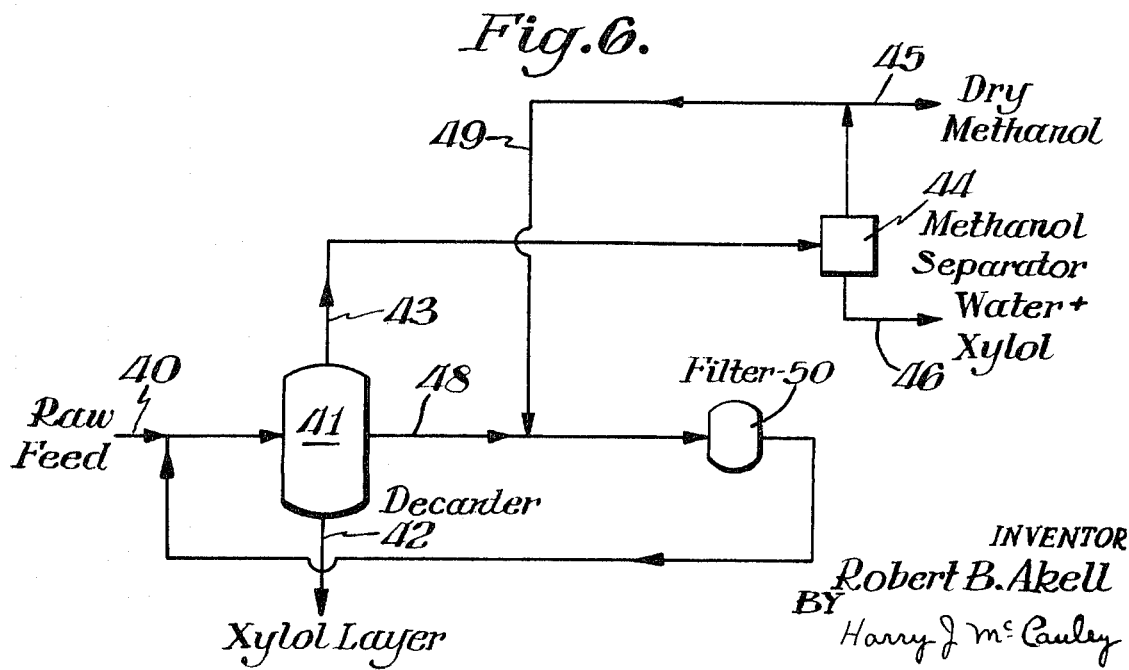

FIG. 1 is a plot of mutual solubility of aniline and water in weight per cent on the abscissa as a function of temperature in degrees C. on the ordinate, FIG. 2 is a plot showing the weight in lbs. of added solvent per lb. of emulsion on the ordinate which must be added (plots A and A' for aniline addition and B and B' for water addition) in order to solubilize emulsions of the weight per cent composition shown on the abscissa, FIG. 3 is a schematic representation of apparatus adapted to breaking an emulsion formed in an aniline-water decantation separation, FIG. 4 is a ternary solubility diagram (approximate) for the system methanol-xylol-water showing the two-phase and one-phase regions, FIG. 5 is a graphically determined plot of weight per cent water (on the methanol-free basis) in the methanol-xylol-water emulsion as abscissa versus the lbs. of methanol per lb. of emulsion required for solubilization in the system of FIG. 4, and FIG. 6 is a schematic representation of apparatus adapted to breaking an emulsion formed in a methanol-xylol-water decantation separation.

Industrial operations involving the contacting or separation of liquids possessing relatively low-mutual solubilities, particularly over prolonged periods of time, frequently present a problem due to the formation of a more or less permanent emulsion of the liquid phases at the liquid-liquid interface. Often this emulsion is stabilized by finely divided solids which may be present in the system and which gradually collect in the emulsion region.

This emulsion layer, sometimes referred to as "interfacial rag," hinders the coalescence and separation of the two liquid phases and reduces contacting equipment performance in both efficiency and capacity.

A principal object of this invention is to provide a means for breaking the interfering emulsion and removing any stabilizing solids therefrom, so that the liquid-liquid contacting equipment, e.g., decanters, multistage column extractors, mixer-settlers or the like, will operate at design efficiency.

This is accomplished by withdrawing the emulsion and adding to it a preselected one of its own constituents in an amount sufficient to completely dissolve the emulsion. If objectionable solids are present, these can then be readily filtered out and the cleansed one-phase liquid returned to the liquid-liquid contacting system from which it was originally removed. Or, if desired, the one-phase liquid can be collected as a separate product, particularly if its return to the main liquid-liquid contacting operation would have an interfering effect thereon. As used in the claims, the word "collecting" is intended to include both ultimate return of the one-phase material to the liquid-liquid contacting system, and its recovery as a separate product, whichever is preferred in the manufacturing operation involved.

There are many common chemical manufacturing operations which involve two liquid phases. Typical examples include: (1) a mixture of two relatively immiscible liquids which it is desired to separate by decantation, such as a naturally occurring mixture of brine and oil, or (2) the condensate obtained by distilling a heterogeneous azeotrope which separates into two liquid phases on being colled and condensed from vapor to liquid.

Another example is a liquid-liquid extraction system wherein a stream of solvent B containing a solute A is mixed with another solvent C with which B is only partially miscible. The purpose is to transfer solute A from solvent B to solvent C, thereby separating A from B. In this operation it is necessary to allow the dispersion to coalesce and separate, as by use of a decanter. It will be understood that the process can be conducted either as a single stage extraction or as a multistage extraction.

If the extraction is to be conducted continuously, it can be carried out in either single or multistage mixer-settlers wherein each mixing operation is followed by a settling region in which the dispersion of the two liquid phases is allowed to coalesce and settle. It is highly desirable to preserve a clean, well-defined interface between the two liquids in the settler stages. However, this is rarely obtained, at least in industrial operations, due to the formation of stable emulsions which remain at the interface, as described in "Liquid Extraction" by R. E. Treybal, 2d Edition, McGraw-Hill Co., New York, page 441.

The problem of interfering emulsions is more severe for industrial systems than it is in the laboratory, because there is a greater opportunity in industry for system contamination, as by dirt and rust, which latter constitute emulsion stabilizers.

It is possible that there is an additional problem such as that described in "Emulsions: Theory and Practice" by P. Becher, ACS Monograph Series No. 162, Rheinhold Publishing Co., New York (1965), page 169, namely, multiple emulsion formation. A multiple emulsion is one in which both types of emulsion exist simultaneously, i.e., an oil droplet may be suspended in an aqueous phase, the oil droplet itself enclosing a water droplet, so that a water/oil/water emulsion exists. Such an emulsion will have an apparent density falling somewhere between the densities of the two primary liquids of the system, so that the emulsion will accumulate at the interface. Becher supra further states (page 143) that if none of the three interfacial tensions between (1) water and oil, (2) solids and water and (3) solids and oil is greater than the sum of the other two, the solid particles will concentrate at the liquid-liquid boundary or interface. In by far the ordinary case, the surface tension relationship will favor solids accumulation at the interface, with accompanying emulsions stabilization.

The prior art has advocated the breaking of emulsions economically by the use of cyclones, centrifuges, coalescers and separating membranes, and electrical devices, but these are all expensive and, in many cases, not completely satisfactory as well. In addition, emulsion breaking, or spontaneous inversion, can be achieved by adding sufficient surface-active agent to displace the absorbed film and stabilize the opposite type of emulsion. However, the incorporation of surface-active agents in the separation system as a whole is not always practicable, because they constitute foreign materials. In addition, there is the expense and requisite fine proportioning of the surface-active agents, both of which are objectionable.

Heating will break most emulsions, but this is uneconomical where there are large process throughputs and, besides, many substances are heat-sensitive or react sufficiently when heated, so that heating is not advisable.

The method of this invention will first be described as applied to a two-component system, i.e., aniline-water, as to which FIG. 1 represents the mutual solubility of the constituents versus temperature. As indicated on the plot, below about 168° C. mixtures of aniline and water will separate into two liquid phases the compositions of which are given by the boundary curve. For example, at 30° C. a mixture of aniline and water containing 50 percent by weight of each will, if allowed to separate, form two layers, one of which is aniline containing about 4 weight percent of water and the other of which is water containing about 2 weight percent of aniline.

FIG. 2 is derived from FIG. 1. Line plot A, for aniline addition at 30° C., has its lower intersection with the abscissa at 96 percent aniline, at which point it is known that a single-phase aniline-water mixture exists. The following general equation can then be written in terms of aniline added for 1 lb. of emulsion:

(I) $1.0(x)+y(1.0)=C(1+y)$ where $x$ = fraction of aniline in the emulsion $y$ = lbs. of pure aniline to be added /lb. of emulsion in order to solubilize the emulsion.

$C$ = fraction of aniline in the one phase boundary composition at the high-aniline end (FIG. 1).

Since, from FIG. 1, it is known that the left-hand composition at the curve line is single-phase to the left of the curve and two-phase to the right of the curve, one can solve for the ordinate value of FIG. 2 at this limiting two-phase point where, at 30° C., the composition is 2 weight percent aniline and 98 weight percent water, the resulting equation being, by substitution in equation (I);

(II) $1.0(0.02)+y(1.0)=0.96(1+y)$, it being understood that 0.96 represents the fraction of aniline in the one-phase boundary composition at the high-aniline end, from which $y=23.5$ lbs.

Equation I, need be determined at two points only, as it has been experimentally verified that the relation is linear, and thus it is possible to read from line A the aniline addition necessary to solubilize any emulsion at 30° C. lying within the two-phase region of FIG. 1.

As an example, an emulsion containing 50 percent aniline and 50 percent water at 30° C. requires the addition of approximately 11.5 lbs. of aniline /lb. of emulsion in order to effect solubilization.

Solubilization by addition of the water component instead of aniline is also completely practicable, plot B for water addition solubilization being drawn in FIG. 2 by the same procedure as hereinbefore described for plot A, except using water as solubilizer instead of aniline.

Thus, the example emulsion composition of 50 percent aniline—50 percent water can equally well be solubilized by addition of 24 lbs. of water /lb. of emulsion, as read from the intersection of the 50 percent composition line with plot B.

The choice of particular solubilizer employed depends upon the availability of one constituent over another, the composition of the emulsion involved, how much total volume of one phase product can be conveniently handled and the particular design of the liquid-liquid contacting equipment with which solubilization is to be associated.

This invention is hereinafter described with reference to aniline solubilizer addition specifically. It will be noted, from FIG. 2, that the maximum amount of aniline required for solubilization, regardless of the composition of the particular emulsion involved, is 23.5 lbs./lb. of emulsion, so that a safe simple practice for emulsion breaking merely involves the addition of this maximum amount.

The effect of temperature on emulsion breaking is dramatically demonstrated by plots A' and B', FIG. 2, for aniline and water addition, respectively, when the emulsion is heated to 150° C. The location of these plots is now shifted markedly downwards along the ordinate, so that a 50 percent aniline—50 percent water emulsion then requires addition of only about 1 lb. of aniline (or 5 lbs. of water) /lb. of emulsion to solubilize.

Referring to FIG. 3, there is shown a typical system adapted to the breaking of an emulsion formed in the course of a conventional continuous aniline-water decantation separation.

The feed comprises, in this instance, a 50 weight percent aniline-water mixture supplied at a temperature of 30° C. to decanter 11 via line 10 at a typical rate of 10,000 lbs./hr. The supernatant water layer containing 2 weight percent aniline is withdrawn through line 12 and routed to water still 15 provided with calandria 15a. The overhead vapor from still 15 passes off through line 16 and is cooled to 30° C. in condenser 17, after which it is separated in decanter 18 into a water layer, refluxed back to the still through line 19, and an aniline layer containing 4 weight percent water which is routed via line 20 to aniline still 21 hereinafter described. Water is removed from the base of water still 15 and passed to the sewer via line 23.

The bottom layer withdrawn from decanter 11 through line 24 and passed to aniline still 21 provided with calandria 21a is aniline containing 4 percent water. This is distilled to dry aniline withdrawn from the base of still 21 through line 26, whereas an aniline-water azeotrope is taken off as vapor through line 27. This passes to condenser 28 and the condensate therefrom, at 30° C., is delivered to decanter 29 where it separates into two layers, the lowermost aniline layer of which is refluxed back to still 21 via line 30 whereas the supernatant water layer, containing 2 percent aniline, is added to the feed of water still 15 via line 31.

The foregoing decantation system is convention in the art. It is important that decanter 11 operates effectively, because, if there is carryover of the aniline layer into the water layer, or vice versa, then the recycle streams processed through lines 20 and 31 become excessive, thereby reducing the capacity of the system.

In practice, undesirable emulsion forms at the liquid-liquid interface within decanter 11 at a typical rate of approximately 0.1 percent of feed, or about 10 lbs./hr. in this instance. If the decanter is provided with a conventional sight glass and vertically adjustable drawoff, not detailed, this emulsion can be readily removed through line 34. It is then solubilized by addition of dry aniline supplied at a rate of 115 lbs./hr., in this example by recycle from the aniline product delivery from still 21 through line 35. The resulting one-phase mixture is then routed through line 36 to filter 37 where emulsion-stabilizing solids are removed, after which it is added through line 38 to the aniline feed stream supplied to still 21 through line 24.

Incorporation of the improvement of this invention with decantation adds virtually no complication to the overall operation, since the feed to aniline still 21 is thereby increased by only about 2 percent. In contrast, decanter 11 capacity increases of the order of 10-25 percent are obtained.

This invention is also applicable to multicomponent systems generally, a typical example being the three-component system methanol, xylol and water having the weight percent ternary solubility relationship shown in FIG. 4, the two-phase region for which lies beneath curve BEGC whereas the one-phase region is thereabove.

Referring to FIG 4, a typical composition line for the ternary mixture involved can be EDF, as verified by the fact that a compositional test for the specific industrial application involved establishes that two phases exist which indeed have the compositions indicated by the terminal points E and F of the tie line. Then a typical ternary mixture along this line can be point D, the composition of which (in weight percent) is 24 percent methanol, 54 percent water and 22 percent xylol. This mixture separates into two phases of the compositions indicated by the ends of the tieline EDF.

By application of the calculation method generally described at pp. 13–15 by Treybal in "Liquid Extraction" supra, it is possible to compute the equivalent of FIG. 2, applicable to a binary system, in order to obtain FIG. 5, applicable to a ternary system for any composition of emulsion taken along a line such as EDF, FIG. 4.

As an alternative here, the individual plot points of FIG. 5 can be determined somewhat more simply graphically as follows by use of the "lever rule" applicable to the individual segment lengths which can be read from FIG 4.

Thus, as an example, if one chooses composition D and draws a line, indicated in broken line representation in FIG. 4 from D to A, which latter represents 100 percent methanol, the line will intersect the one-phase to two-phase boundary line at G. Then, by the lever rule, if one takes the ratio of the length of line segment D G, which is a measure of the methanol which must be added to reach the phase boundary line at point G, to the length of the line segment G A, which is a measure of the emulsion which exists in the reverse sense between 100 percent methanol at point A to point G, the numerical value obtained is approximately 1.30.

Point D, on the methanol-free basis, is a mixture of 54 parts of water out of a total of 54 parts water plus 22 parts xylol, i.e., a mixture constituting approximately 70 weight percent water. Thus, the point D of FIG. 5 corresponds to approximately 1.30 lbs. of methanol to be added /lb. of emulsion in order to reach the one-phase region of FIG. 4. The other curve points plotted in FIG. 5 were similarly determined for other compositions of emulsion falling along line EDF of FIG. 4. Experimental work has verified the accuracy of FIG. 5 for representative compositions of the emulsions involved and it has also be confirmed that addition of a maximum of about 2.0 lbs. of methanol per lb. of emulsion, indicated by FIG. 5, breaks all emulsions encountered within the range embraced by tie line EDF, so that one can safely rely on this addition as operative independent of emulsion composition.

It is clear from the application of the lever rule hereinbefore described, that it is much more advantageous, in terms of amount of component required to break the emulsion that one utilize methanol instead of either water or xylol as the additive, because the line segments running from either D to B or D to C, FIG 4, are proportionately much larger than the very short segments running from points B and C, respectively, to the phase boundary curve, so that the corresponding ratios would be very large indeed.

Accordingly, methanol is utilized to solubilize emulsion formed in a typical industrial decantation of the methanol-water-xylol system shown in FIG 6.

Here a typical feed falling along composition line EDF, FIG. 4, constituted, in lbs./hr., 10,900 lbs. of methanol, 32,000 lbs. of water and 124,000 lbs. of xylol, which was introduced into decanter 41 via feed line 40. The mixture separated into two liquid phases in decanter 41, the xylol phase constituting approximately 336 lbs. of methanol, 78 lbs. of water and 122,920 lbs. of xylol being drawn off for further treatment through bottom line 42. Similarly, the water phase, constituting approximately 12,564 lbs. of methanol, 31,922 lbs. of water and 1,080 lbs. of xylol was withdrawn through topline 43 and sent to methanol separating still 44, dry methanol being recovered as distillate product through line 45 whereas water-xylol is the bottom product recovered through line 46.

In the course of prolonged operation an emulsion, which may have any composition along line EDF, can form at the interface in decanter 41, which is provided with a conventional sight glass and adjustable level emulsion draw off, not detailed. In a typical instance 1,000 lbs. per hour of emulsion analyzing 150 lbs. methanol, 340 lbs. water and 510 lbs. xylol (i.e., the composition indicated at point H of FIGS. 4 and 5) was removed via line 48. The emulsion was broken by addition of 2,000 lbs./hr. of methanol (i.e., the maximum of 2.0 lbs. methanol/hr. emulsion as hereinbefore taught) supplied as recycle from methanol still 44 via line 49, and emulsion-stabilizing solids were removed from the one-phase mixture by subsequent passage of the latter through conventional filter 50. The filtered solution, totaling 3,000 lbs./hr., is then recycled to the feed line 40 supplying decanter 41. Thus, the recycled fraction constitutes an added load on decanter 41 of only about 1.8 weight percent, which is relatively insignificant in exchange for the 10–25 percent capacity increase obtainable through use of this invention.

The foregoing examples have taught the addition of relatively pure components for the breaking of emulsions. This is advantageous because the volume required is correspondingly reduced; however, dilution can be tolerated in many instances where an increased volume of recycle is not objectionable and where the diluent involved does not independently interfere with the emulsion breaking per se.

From the foregoing, it will be understood that this invention is effective in the breaking of troublesome emulsions by the utilization of relatively small quantities of a preselected component of the emulsion itself, thereby avoiding contamination of the system with foreign substances hitherto utilized as emulsion breaking agents. Moreover, the amounts of additive employed are so small as to have a relatively minor effect on the liquid-liquid contacting operations themselves or, at least, the advantages of employing the invention are not significantly counterbalanced by interference with the liquid-liquid contacting operations which it is desired to improve. This invention provides for economic complete recovery of the components of the emulsion without discard to the sewer, thereby reducing waste as well as environmental contamination. Finally, the invention can be incorporated in existing liquid-liquid contacting operations at small expense, because there is required only a small amount of extra apparatus and piping.

What is claimed is:

1. In a liquid-liquid contacting process wherein liquids possessing relatively low-mutual solubilities form two liquid phases separated by an emulsion therebetween, said emulsion consisting of components contained within said liquids, the process comprising in sequence:
   1. withdrawing said emulsion,
   2. adding to said emulsion a quantity of a preselected component of said emulsion in an amount sufficient to bring the composition of said emulsion into the one-phase region of the solubility diagram for the component system making up said emulsion, and
   3. collecting the one-phase product from (2).

2. In a liquid-liquid contacting process wherein liquids possessing relatively low-mutual solubilities form two liquid phases separated by an emulsion therebetween, said emulsion consisting of components contained within said liquids, the process of claim 1 wherein said one-phase product from (2) is recycled to said liquid-liquid contacting process.

3. In a liquid-liquid contacting process wherein liquids possessing relatively low-mutual solubilities form two liquid phases separated by an emulsion therebetween, said emulsion consisting of components contained within said liquids, the process of claim 1 wherein said one-phase product from (2) is filtered to remove stabilizing solids therefrom and thereafter recycled to said liquid-liquid contacting process.

* * * * *